United States Patent [19]

Awad et al.

[11] Patent Number: 5,442,638
[45] Date of Patent: Aug. 15, 1995

[54] APPARATUS AND METHOD FOR RECORDING OVER DEFECTS IN STORAGE MEDIA

[75] Inventors: Joseph C. Awad; James W. Eldridge; David G. Foote; Norman K. Ouchi, all of San Jose, Calif.

[73] Assignee: International Business Machines Corporation, Armonk, N.Y.

[21] Appl. No.: 179,405

[22] Filed: Jan. 10, 1994

[51] Int. Cl.[6] ...................... G06F 11/00; G06F 11/10; G11B 7/00; G11B 27/36
[52] U.S. Cl. ................................ 395/182.04; 371/30; 371/40.3; 395/439; 360/31
[58] Field of Search ...................... 371/13, 10.1, 7, 30, 371/40.3; 395/575, 600, 425; 364/947.7, 245.3, 955, 281.1, 239, 956, 956.4; 380/4; 360/72.1, 31

[56] References Cited

U.S. PATENT DOCUMENTS

| Re. 34,003 | 7/1992 | Weng | 360/72.2 |
|---|---|---|---|
| 3,997,876 | 12/1976 | Frush | 340/172.5 |
| 4,434,487 | 2/1984 | Robinson et al. | 371/10 |
| 4,549,295 | 10/1985 | Purvis | 371/13 |
| 4,571,716 | 2/1986 | Szerlip | 369/54 |
| 4,791,622 | 12/1988 | Clay et al. | |
| 4,980,878 | 12/1990 | Szerlip | 369/54 |
| 5,172,381 | 12/1992 | Karp et al. | 371/42 |

OTHER PUBLICATIONS

Computer Dictionary, 2d ed., Microsoft Press, (1994), p. 151.
W. Janus, "Skip of Magnetic Tape Defective Area," in *IBM Technical Disclosure Bulletin*, vol. 13, No. 6 (Nov. 1970), pp. 1413–1414.

*Primary Examiner*—Robert W. Beausoliel, Jr.
*Assistant Examiner*—Alan M. Fisch
*Attorney, Agent, or Firm*—Baker, Maxham, Jester & Meador

[57] ABSTRACT

Storage media defect areas that are too large to be managed by ECC processing alone and sufficiently small that read/write head clock synchronization can be maintained over the defect area, are managed by a fill pattern recording scheme in which an offset register indicates the beginning of a defect area and a fill pattern is recorded over the defect area while ECC processing is halted. Data recording is resumed after the defect area is passed. In this way, the number of times sector skipping must be used for a storage media is reduced, thereby making more efficient use of the storage media surface area.

18 Claims, 7 Drawing Sheets

APPARATUS AND METHOD FOR RECORDING OVER DEFECTS IN STORAGE MEDIA

BACKGROUND OF THE INVENTION

1. Field of the Invention

This invention relates generally to recording and retrieving data on storage media and, more particularly, to accurately recording and retrieving data over defects in storage media.

2. Description of the Related Art

Track-oriented magnetic digital data storage media, such as magnetic tape and magnetic disk, comprise a magnetic coating applied to a substrate. As the magnetic storage media moves relative to read/write heads of a storage device, data can be magnetically recorded and read over the media in tracks that are divided into blocks or cells. Such storage media typically have surface defects of varying sizes that can create errors in the recording and reading of data. Surface assessment techniques are used to identify the location and extent of the defect areas and defect management systems ensure the correct recording and reading of data despite the defects. Conventionally, one of two defect management techniques are employed depending on the size of the defect and the resulting error. Small defect areas produce small errors that are corrected using error correction code (ECC) processing. Larger defect areas are skipped over by labeling an entire recording area as defective and moving the storage media relative to the read/write heads or by writing a gap code over the defect area.

The ECC method comprises a continuous processing of a data field as it is written and appending a redundancy field to the data, the value of which is determined by the data content. When the data field is retrieved it is processed in a similar manner, together with the redundancy field, to generate error syndromes. An error control code with a two byte redundancy field, for example, may be capable of reliably detecting up to two bytes and correcting one byte in error in a thirty-two byte data field. Codes of this type are commonly interleaved to provide protection against errors spanning several bytes. If the received data field is held in a small first-in-first-out buffer, then many errors in the data can be corrected with only a small delay to the first data field. These methods provide a convenient means for a storage subsystem to manage small media defects or other data transmission problems that result in short error bursts spanning only a few bytes. When this type of correction is possible, the data flow from the storage device is not interrupted.

The larger defect areas cause recording and reading errors too large to be corrected by ECC processing and therefore are skipped by designating an entire recording block or cell as defective. A defective block is skipped by moving the read/write head relative to the storage media to a designated alternate, spare block area of the media or by writing a gap field to move the head relative to the defect area as described, for example, in U.S. Pat. No. 3,997,876 to Frush. In either case, the read/write head of a storage device is moved relative to the storage media and the reading and recording of data is suspended so that the defect area is skipped by the head without reading and recording of data and without ECC processing. To increase the speed with which the large defects can be skipped, all skip operations typically are of the same size. Thus, for every defect too large to be corrected by ECC processing, the extent of storage media skipped will be the same size regardless of the defect size.

In general, the size of the skips is dependent on the data format of the storage device. For example, in a fixed-block architecture storage device, blocks are defined in tracks across the surface of the storage media in blocks of a predetermined size comprising hundreds, or even thousands of bytes per block. The blocks are filled in with data during recording operations. A defect-containing area of the storage media is skipped by Skipping the entire data block in which the data otherwise would be recorded. Instead, the data is recorded in a spare block of the storage media that is reserved for just such purposes. In a count-key data storage device, data is recorded on the storage media in tracks comprised of cells somewhat smaller than a typical data block. Each track includes a header field that identifies the track number and an offset value that specifies the number of cells to any defect area in the track. At a defect area, writing is suspended and storage device clock synchronization is lost, a predetermined number of cells are skipped, clock synchronization is acquired again, and writing is resumed. Subsequent data blocks are shifted down by the number of cells skipped, using a reserved spare space at the end of a track. In either block skipping method for defects too large for ECC processing, the size of the storage media area skipped is predetermined using statistical information concerning the expected size and number of defects for the particular storage media and must encompass an area no smaller than the number of bytes that could be handled by ECC processing but larger than the largest expected defect area.

Both block skipping methods can be inefficient if the size of the defect area being skipped is small relative to the size of the storage media area being skipped. For example, a defect that is relatively small, although still too large for correction by ECC processing, consumes an entire recording block or cell. A block or cell can be, for example, 4K bytes of disk space. A defect too large for correction by ECC processing can be on the order of less than 100 bytes. Thus, over 3K bytes of storage media surface area is commonly wasted by block skipping methods.

Because storage media defects can arise after an initial surface assessment and at any time during the useful life of a magnetic storage media, block skipping methods must reserve space for future defects by allocating spare block areas even in the absence of detected defects. This creates relatively large amounts of unused storage media area. Such overhead increases the inefficiency of block skipping methods. Finally, many disk array subsystems incorporate multiple devices that transfer data in parallel. Block skipping interrupts such parallel data transfer, requiring complex control mechanisms to restore parallelism or minimize the interruption.

From the discussion above it is apparent that there is a need for a defect management system that can process storage media defects that are too large to be handled by ECC processing, without allocating large amounts of storage media space to skip these relatively small defects. The present invention satisfies this need.

SUMMARY OF THE INVENTION

In accordance with the present invention, a data storage device for recording data blocks onto tracks of a storage medium with a write head adapted for movement relative to the medium identifies a defect area that is too large for error correction code (ECC) processing, but sufficiently small for the storage device to maintain clock synchronization across the defect area, and records a fill pattern directly over the defect. The processing of ECC information is halted while the fill pattern is recorded. The ECC processing and the recording of data is resumed after the fill pattern is recorded. Thus, the head does not lose data synchronization over the defect area, permitting more rapid defect management. Moreover, the size of the fill pattern is much less than an entire block and therefore the invention allocates much less overhead in terms of storage media surface area to each defect, thereby permitting a greater number of defects to be managed with no increase in overhead.

The location of a defect area is determined by surface assessment. When the track structure of the storage media is fixed, such as at disk initialization time, the location of the defect areas in a track or block are identified by recording pointer or offset location data into a header field of a track or block. A predetermined number of spare fill-pattern blocks are located at the end of a track or data block and comprise a predetermined number of bytes. The spare blocks may contain the fill pattern, which may comprise a predetermined binary pattern. During the recording of data, when the read/write head is moved relative to the storage medium and encounters the pointer data, the storage device will halt ECC processing while the head is over the defect area, record a fill pattern block over the defect area, and resume ECC processing and data recording after the defect area has been passed. Clock synchronization is maintained as the fill pattern is recorded.

In this way, it is unnecessary to skip over an entire data block if the defect area is sufficiently small for the storage device to maintain clock synchronization over the fill pattern. Defect areas that are so large that clock synchronization cannot-be maintained are skipped using conventional block skipping methods such as described in the Background section above. The necessity of using the block skipping method, however, will be much less frequent. The length of the fill pattern is determined in accordance with the block structure of the storage device and the defect distribution for the storage media, including the expected defect size and number of defects per unit area of the storage media, so that the fill pattern is sufficiently large to cover most defects but sufficiently small for storage device data clock synchronization to be maintained.

Other features and advantages of the present invention should be apparent from the following description of the preferred embodiment, which illustrates, by way of example, the principles of the invention.

DESCRIPTION OF THE PREFERRED EMBODIMENT

Figure 1:
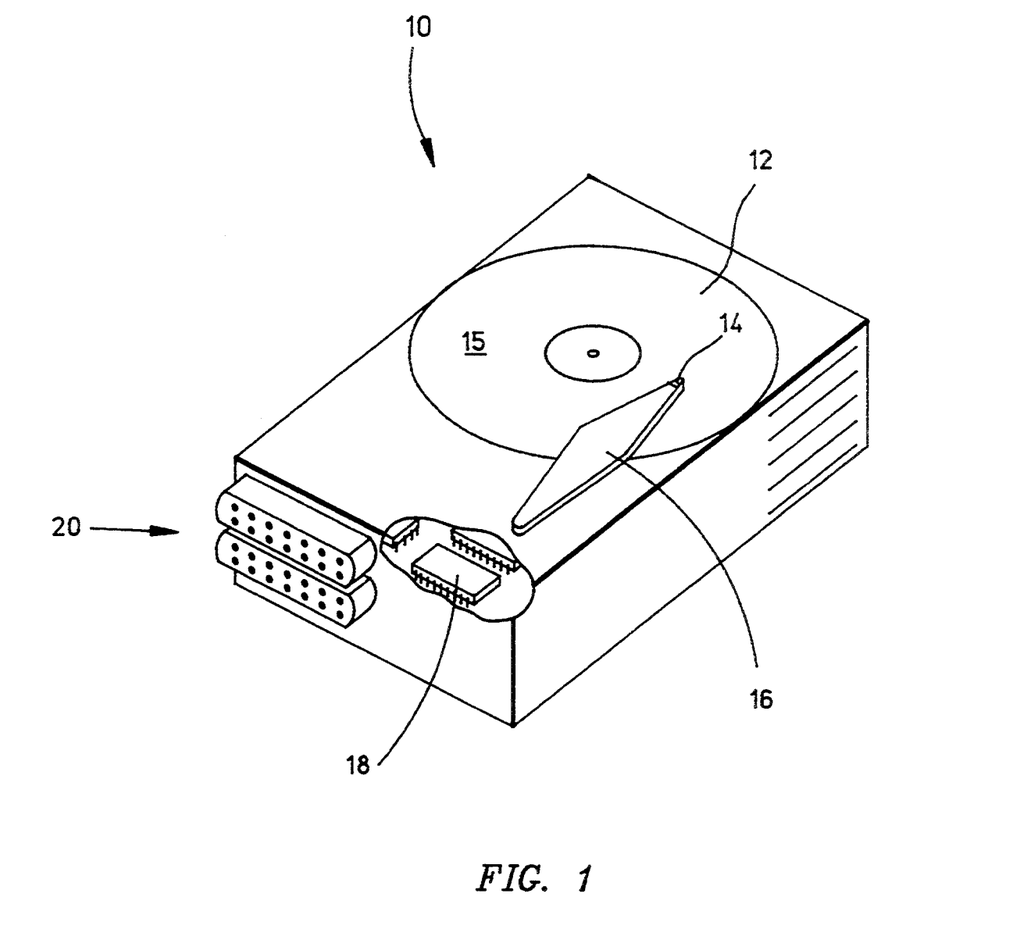
FIG. 1 is a perspective view of a storage device constructed in accordance with the present invention.

FIG. 1 shows a data storage device comprising a disk drive storage device 10 having a magnetic data storage medium comprising a magnetic disk 12 that rotates relative to a read/write head 14 suspended above the disk surface 15 by a head suspension arm 16 adapted to move across the disk for reading and recording data in circumferential tracks of the disk. The disk drive 10 includes a disk controller 18 and input/output parallel pin connectors 20. The disk controller controls movement Of the disk arm and controls reading and recording operations for the transfer of data between the disk drive and an associated host processor (not illustrated) through the input/output parallel pin connectors 20. The controller operates in conjunction with a host system clock signal received from a system clock of the host processor through the pin connectors. In accordance with the invention, during a data recording operation, if a defect area in the disk surface 15 is too large to be managed by conventional error correction code (ECC) processing, but is sufficiently small for the read/write head to maintain clock synchronization across the defect area, then the controller 18 causes a fill pattern to be recorded over the defect area and halts ECC processing while the fill pattern is recorded. When recording of the fill pattern is completed, ECC processing and recording of data is resumed. Similarly, when the location of the fill pattern is reached while retrieving the data, then data and ECC processing is suspended until the fill pattern is retrieved and discarded, at which time data and ECC processing is resumed. Data flow will only be interrupted for the length of the fill pattern. Thus, defect areas too large for ECC processing, but small relative to the disk area that otherwise would be skipped, are managed by recording a fill pattern that consumes less disk space than would be consumed by a block skipping process with no break in clock synchronization. In this way, less space is wasted on the disk due to defect areas and more effective use is made of the available disk surface area and defect management proceeds more quickly.

Figure 2:
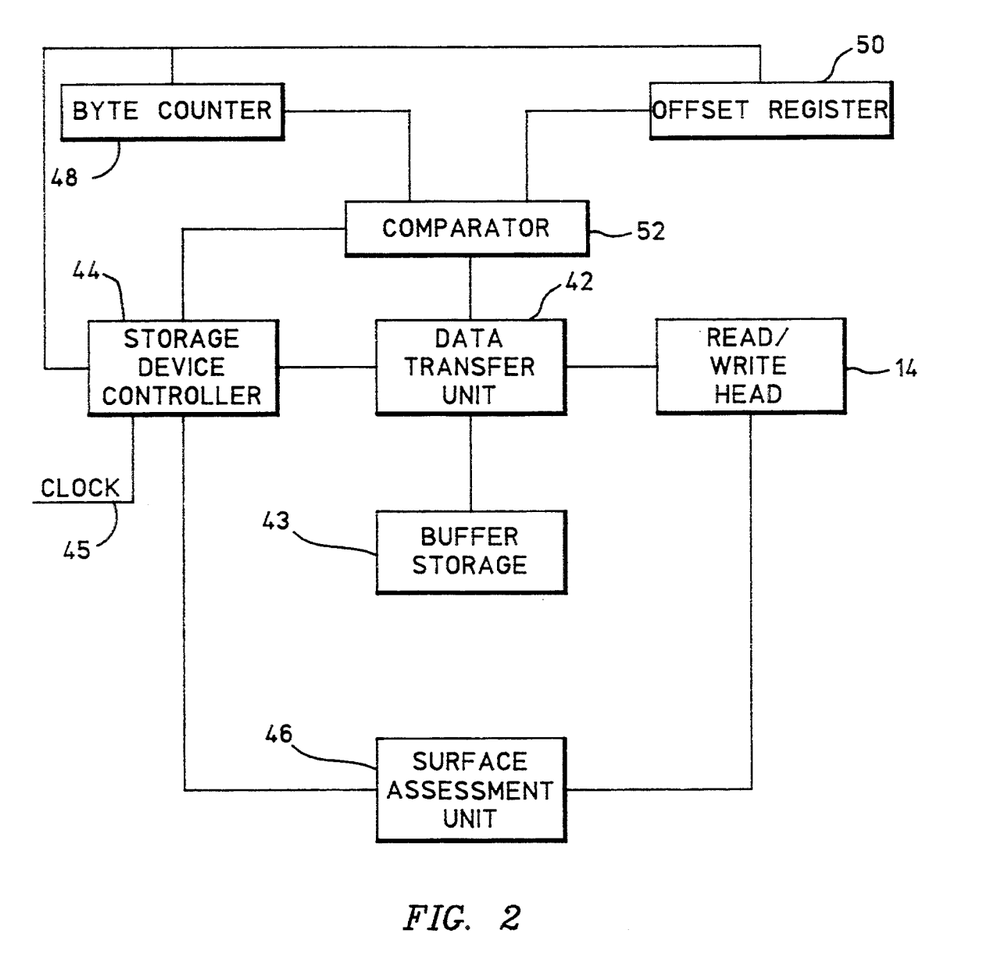
FIG. 2 is a block diagram of the storage device illustrated in FIG. 1.

FIG. 2 shows a block diagram of the disk drive 10 illustrated in FIG. 1. Data is stored on the storage media disk 12 (FIG. 1) in a fixed-block architecture in concentric tracks organized into blocks comprising a synchronization field, a header field,. one or more data subblocks for containing data, an error correction code (ECC) redundancy field, and one or more fill pattern fields. It is to be understood, however, that the invention can be applied to other data architectures including, for example, count-key systems.

In the preferred embodiment illustrated in FIG. 2, the disk controller 18 (FIG. 1) of the storage device 10 includes a data transfer unit 42 and a storage device controller 44 that are integrated and packaged with the disk drive. The data transfer unit 42 processes the ECC information for a data sub-block and also controls the read/write head 14 to read and record data from a data sub-block, or read and record the ECC information field, or read and record the fill pattern onto the storage medium. The data transfer unit uses a buffer storage area 43 for temporary storage of data during ECC processing and transfer of data to and from the disk. The storage device controller 44 controls the data transfer unit to carry out the appropriate reading and recording operations. As noted above, the storage device receives a clock signal 45, which it provides to the data transfer unit. The data transfer unit, in turn, ensures that operation of the read/write head is maintained in synchronization with the clock signal. Alternatively, the data transfer unit and device controller can be provided as separately configured elements, wherein the device controller is not provided as an element of the disk controller 18 but is mounted off the disk drive 10.

A surface assessment unit 46 performs a surface assessment of the magnetic disk 12 (FIG. 1) to identify the location of defects in the surface of the disk. Such surface assessment is performed, for example, when the disk is originally manufactured and initialized, or whenever a disk diagnostic program is run. In a fixed-block architecture device, as described above, the surface assessment unit identifies defect areas on the disk as the storage device controller 44 partitions the disk storage area into blocks. The surface assessment unit 46 identifies the location of defects by generating a defect signal that comprises a sequence of values corresponding to the location of defects relative to a reference point on the disk. The defect signal can comprise, for example, the number of bytes to the start of a defect area relative to the beginning location of a block.

For example, the surface assessment unit 46 can identify defect areas by generating an offset from an index point on the disk, such as the beginning of a data block, to defect areas as they are identified, thereby generating a defect map for the entire block or disk surface. The offsets provided by the defect map can be mapped into the block header fields and fill patterns can be recorded at the offset locations. The surface assessment unit identifies a defect area by attempting to record data at a disk location and then read it back. If the data cannot be successfully recorded to disk and read back, then a defect is identified. If a defect area is identified and a fill pattern is recorded over the defect area using the point-and-fill scheme of the present invention, and if data still cannot be successfully recorded and read back, then the defect area extends over a surface area greater than can be managed by the fill pattern. In that case, a conventional block skipping routine would be used. In this way, the surface assessment unit effectively determines the location and extent of the defect area.

As noted above, the disk 12 is organized into blocks comprising a synchronization field, a header field, one or more data sub-blocks containing data, an error correction code (ECC) field, and one or more fill pattern fields. If the disk controller 18 determines that the defect area identified by the surface assessment unit 46 is too large to be managed by ECC processing, then the disk controller will determine if the defect area is sufficiently small to maintain clock synchronization of the read/write head across the defect area, rather than automatically skipping an entire block that otherwise would contain the defect. If data clock synchronization can be maintained, then the disk controller 18 will cause the data transfer unit 42 to store defect location and size data in the header field. Processing by the surface assessment unit then will continue over the remainder of the disk surface area.

After completion of the surface assessment and during the recording of data onto the magnetic disk 12, the data transfer unit 42 and storage device controller 44 will be provided with the location and size of the defect area from the block header field. The controller then will control the data transfer unit to suspend ECC processing and record the fill pattern while the read/write head is over the defect area. Thus, the read/write head of a disk storage device will be moved over the defect area without interruption to the clock synchronization of the read/write head and without skipping an entire block area to avoid the defect. This can result in a significant savings of unused disk space, as a block can comprise, for example, thousands of bytes of storage media, whereas a defect area too large to be handled by ECC processing may comprise only tens or hundreds of bytes.

In particular, the storage device controller 44 determines when the read/write head 14 is over the defect area by keeping track of the present location of the head with a byte counter 48. The byte counter maintains a count of the number of bytes moved by the read/write head relative to a reference point of a data block, such as the beginning of the data block. An offset register 50 contains a count of the number of bytes from the reference location to a defect area, as retrieved from a header field of a data block. The controller uses a comparator 52 to compare the present location of the head specified by the byte counter 48 with the location of the defect area specified by the offset register 50. When the comparator indicates that the read/write head is located over the defect area, the storage device controller 44 produces the appropriate command signals and provides them to the data transfer unit 42 to halt ECC processing and begin recording of the fill pattern, as described further below. It should be noted that the size of the fill pattern is selected to be somewhat greater than the average expected size of a defect to be handled in accordance with the invention.

As noted above, defects can arise or become larger with time. Therefore, in the preferred embodiment, a storage device in accordance with the invention records the fill pattern such that the defect area is approximately centered in the fill pattern. For example, if the fill pattern is selected to be twenty bytes in length and a defect is determined to be ten bytes in length, then the fill pattern will be recorded starting at approximately five bytes before the beginning of the defect area. In this way, the fill pattern will be centered over the defect such that the fill pattern extends five bytes before and five bytes after the defect area. This scheme maximizes the likelihood that, if the defect area becomes larger with time, then the enlarged defect area will affect only the fill pattern and no data will be lost. Those skilled in the art will appreciate how to select the size of the fill pattern and the placement of the pattern around the defect area in accordance with the expected size and frequency of defects in a particular storage media.

Alternatively, a storage device can treat all defect areas larger than can be managed by ECC processing and sufficiently small to maintain clock synchronization as the same size. That is, the storage device can locate a fill pattern block over a defect area beginning at a standard offset from the beginning byte of the defect. For example, a fill pattern can be recorded beginning at a distance of 50 bytes from the start of all defect areas. The construction of the disk controller 18 is somewhat simplified with such a technique, but the fill pattern will not necessarily be centered over any defect area.

The surface assessment and corresponding data block manipulation can be better understood with reference to FIGS. 3 through 7, which depict a data block written onto a storage medium. Although the preferred embodiment and the data blocks are described with respect to a fixed-block architecture disk drive, it is to be understood that the principles of the invention can be applied to other architectures and devices.

Figure 3:
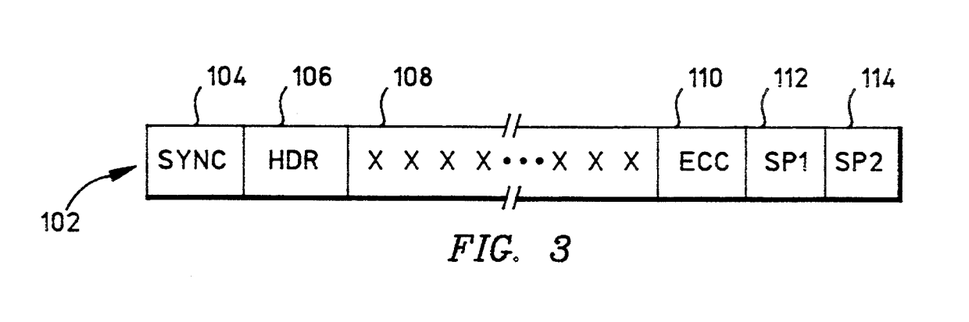
FIGS. 3, 4, 5, 6, and 7 are diagrammatic representations of data blocks written onto a storage medium by the storage device illustrated in FIG. 1.

FIG. 3 shows a data block 102 that is organized into a synchronization field 104, a header field 106, a data field 108, an ECC field 110, a first fill pattern field 112, and a second fill pattern field 114. The synchronization field contains clock synchronization data represented by the designation SYNC and the header field contains various header data, described more fully below, represented by the designation HDR. The data field is filled with a plurality of data elements represented by X, each of which may represent a byte of data. The spare areas that may be used for the fill pattern fields 112, 114 are represented by the designations SP1 and SP2, respectively. It should be understood that a greater or lesser number of spare areas per data field can be provided. The number and size of the fill patterns can be determined in accordance with the expected number and size of defect areas of the particular storage media, as will be known to those skilled in the art. The data block in FIG. 3 represents a situation in which no defects in the magnetic disk over the area containing the data block have been located by a surface assessment unit.

Figure 4:
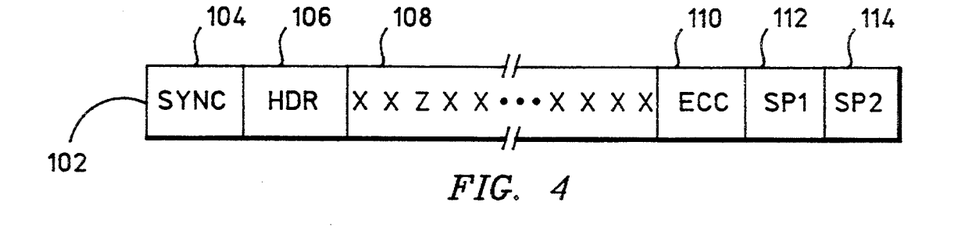
Figure 5:
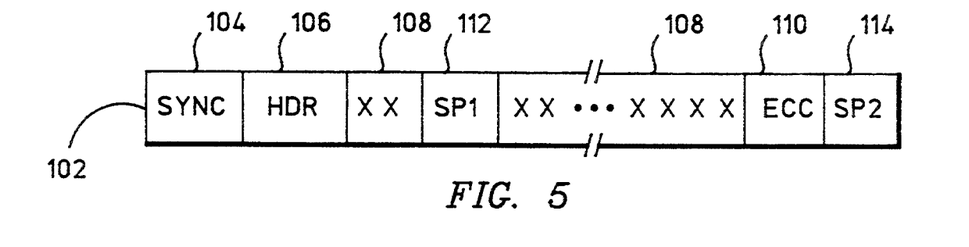

In FIG. 4, a defect within the area otherwise occupied by a data block is indicated by the letter Z. In accordance with the invention, the location of the defect is indicated by a byte offset recorded in the header field at the time of surface assessment. As illustrated in FIG. 5, the storage device then records one of the fill patterns SP1 over the area of the disk that contains the defect. Thus, the data elements X are recorded until the location specified by the offset in the header field indicates that the read/write head 14 (FIG. 1) is positioned adjacent the defect area. The data transfer unit 42 then directs the recording of the first fill pattern block SP1 over the defect area.

During the recording of the fill pattern over a defect, the ECC processing is halted. After the fill pattern has been recorded, the data transfer unit directs the continuation of recording the data elements to the disk and the resumption of ECC processing. Thus, the read/write head never loses clock synchronization through the data block 108 and therefore multiple SYNC fields per data field are not necessary. FIG. 5 shows that, at the end of the data field, the ECC data determined in accordance with the data elements X is recorded and the remaining spare fill pattern block SP2 is recorded. Space on the storage medium for the fill patterns must be reserved at the spare block area so that future defects within the data field 108 can be managed by recording the fill pattern SP2 over the defect without shifting all of the following data recorded on the storage medium. This can be done by recording fill pattern blocks at the spare block area. Alternatively, fill patterns might not be recorded on the disk unless used for defects.

Figure 6:
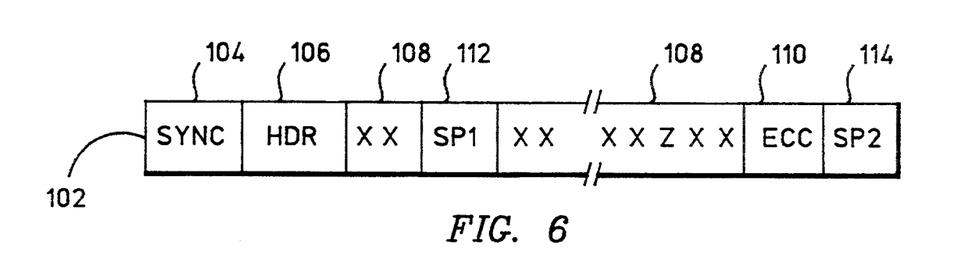
Figure 7:
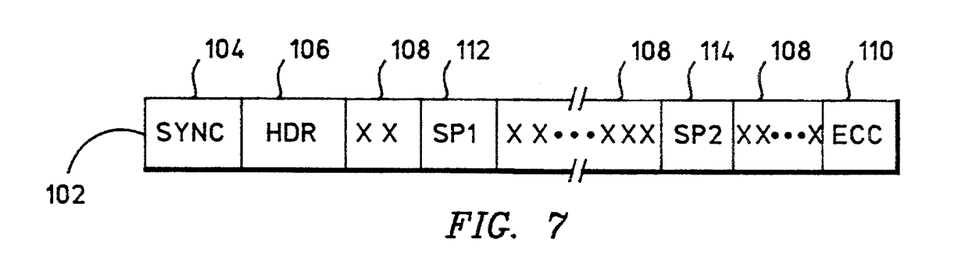

Surface defects can arise during the lifetime of a storage media and can be located by a surface assessment unit. FIG. 6 illustrates the situation in which the storage media on which the data block 102 is written later develops a second defect denoted by the designation Z. In such a circumstance, the second fill pattern block SP2 is recorded over the defect area, as illustrated in FIG. 7. If yet a third defect area is later detected in the same data block, then a block skipping method is used to skip the data block entirely. The number of fill patterns, however, should be selected to minimize the occurrence of block skipping, in accordance with known statistical information concerning the incidence of surface defects for the particular storage media.

Figure 8:
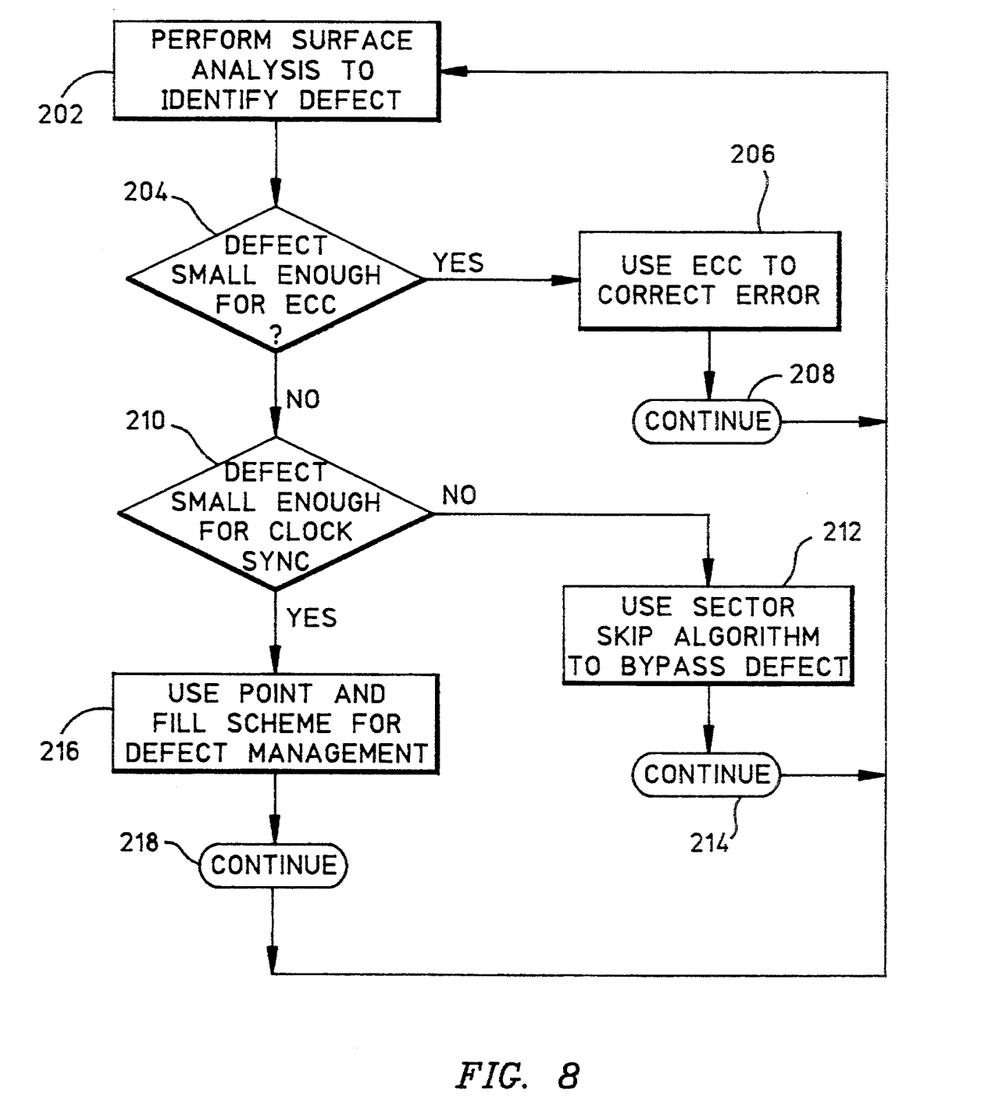
FIGS. 8, 9, 10, and 11 are flow diagrams illustrating the operation of the storage device illustrated in FIG. 1.

The operation of the data storage device illustrated in FIGS. 1 and 2 will be better understood with reference to the following flow diagrams illustrated in FIGS. 8, 9, 10, and 11. In FIG. 8, a surface analysis is initially performed by a surface assessment unit of the device and a defect in the storage media is identified in the box numbered 202. The surface assessment unit identifies both the location and size of the defect. Alternatively, the surface assessment unit can perform a surface analysis continuously over the entire storage media and identify all defects in the media.

In the decision box numbered 204, the device checks to determine if the identified defect area is sufficiently small to be managed by the ECC processing. If the ECC processing can manage the defect, then the device will use the ECC processing scheme, as indicated at the box numbered 206. The surface assessment continues, as indicated by the continuation box numbered 208. Those skilled in the art will appreciate that, if the surface assessment was performed continuously over the entire storage media, then the next step after the continuation box would be to proceed with the next identified defect.

If the defect is too large to be handled by ECC processing, then the data storage device proceeds at the box numbered 210 to determine if the defect area is sufficiently small so that clock synchronization of the read/write head can be maintained over the defect area. If the defect area is too large to maintain clock synchronization, then the device uses a conventional sector skip scheme to bypass the defect area at the box numbered 212 and then continues with surface assessment at the box numbered 214. If the defect area is small enough to maintain clock synchronization, then the device uses the point-and-fill scheme of the present invention to manage the defect at the box numbered 216 and then continues surface assessment at the box numbered 218.

Figure 9:
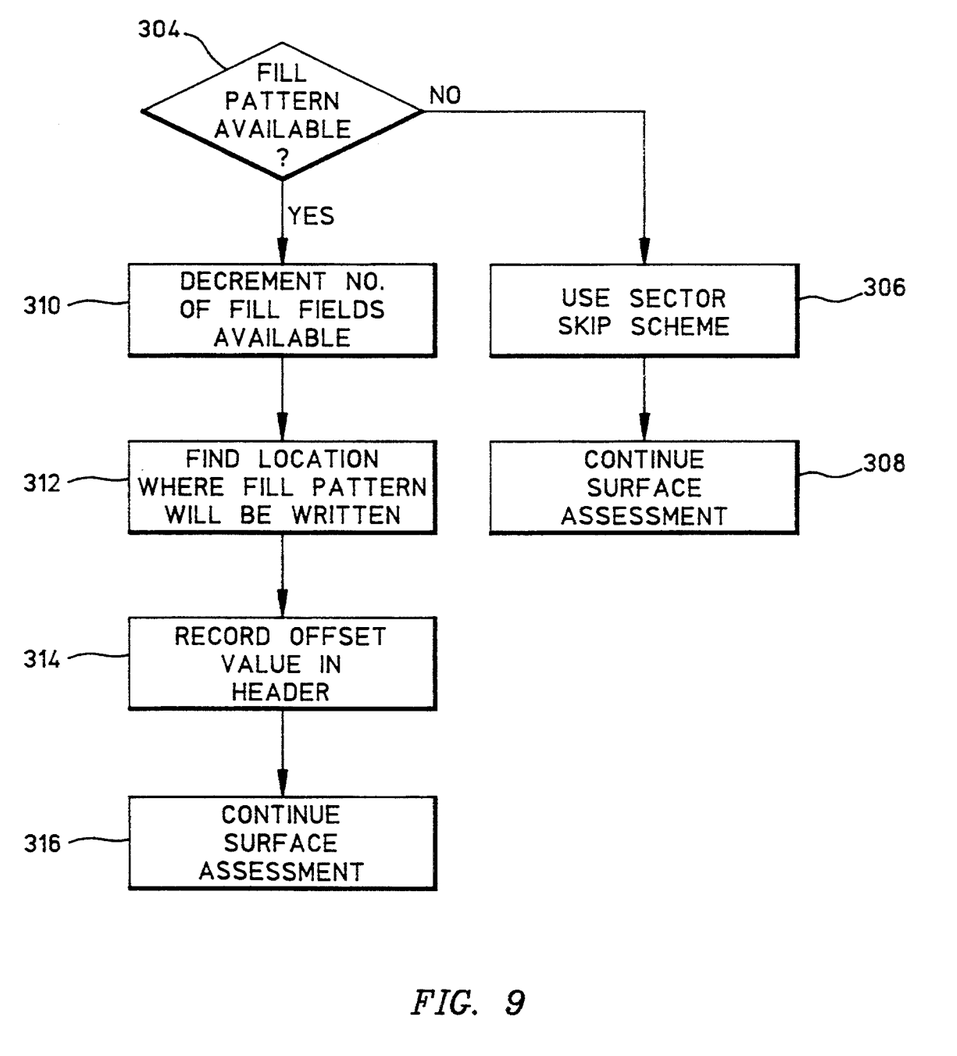

FIG. 9 illustrates details of the point-and-fill scheme of the present invention. At the time of block formatting, after a defect has been identified as suitable for the point-and-fill scheme, the data storage device determines if a fill pattern spare block still is available for use, as indicated at the decision box numbered 304. Availability can be indicated, for example, by a fill pattern bit or pointer in a header field. If a pointer in the header field is used to indicate availability, then the pointer can initially point to a default area at the end of a block to the fill pattern locations. Each fill pattern spare block is assigned an associated pointer. Each pointer can initially hold the offset to the designated spare area at the end of the block. If defects are located by the surface assessment unit, then the pointers can point to the respective defect areas. Thus, to determine if a fill pattern block is available for use, it is only necessary to check the header pointer field. If a pointer is pointing to the default area, then the associated fill pattern block is available.

If all available fill pattern blocks have already been used, then the device uses the conventional sector skip scheme, as indicated at the box numbered 306. Surface assessment and formatting is then continued at the box numbered 308. If a fill pattern block is available, then the data storage device decreases the number of fill blocks available by one at the box numbered 310. This can be achieved, for example, by setting a fill-pattern bit in a header field. Next, at the box numbered 312, the device determines a byte offset by finding the beginning byte, relative to the beginning of the data sub-block, of the area at which the fill pattern will be recorded later. The storage device does not actually record the fill pattern at the defect area until data recording takes place, as described further below. At surface assessment and block format time, the device simply locates the defects and provides a pointer by recording the byte offset. This speeds the formatting process and avoids unnecessary delay.

The byte offset value is recorded in the header field (as illustrated in FIGS. 3-7) as indicated at the box numbered 314. As noted above, the fill pattern preferably is recorded approximately centered about a defect area. Therefore, the byte offset value recorded in the header field advantageously is set equal to a value relative to a block reference point, such as the beginning of the data field, that will center the fill pattern around the defect. For example, if a defect area extends for a length $x=10$ bytes from a position $x_1=500$ bytes from the beginning of the data field to a position $x_2=510$ bytes, and if the fill patterns are 30 bytes in length, then the fill pattern will be recorded from a position $x_3=490$ to a position $x_4=520$. Thus, the byte offset value recorded in the header field will be set to a value that corresponds to a location of $x_3=490$ bytes from the block reference point. Alternatively, the byte offset value recorded in the header field can be set equal to the beginning byte location of the defect relative to a block reference point and the determination of the fill pattern beginning location can be determined at the time the fill pattern is recorded. The determination of the value needed to achieve centering can be performed, for example, by the data transfer unit. At the flow diagram box numbered 316, the read/write head is moved past the defect area and thereafter surface assessment is continued. In either case, the data storage device uses the pointer to determine where the fill pattern will be recorded.

Figure 10:
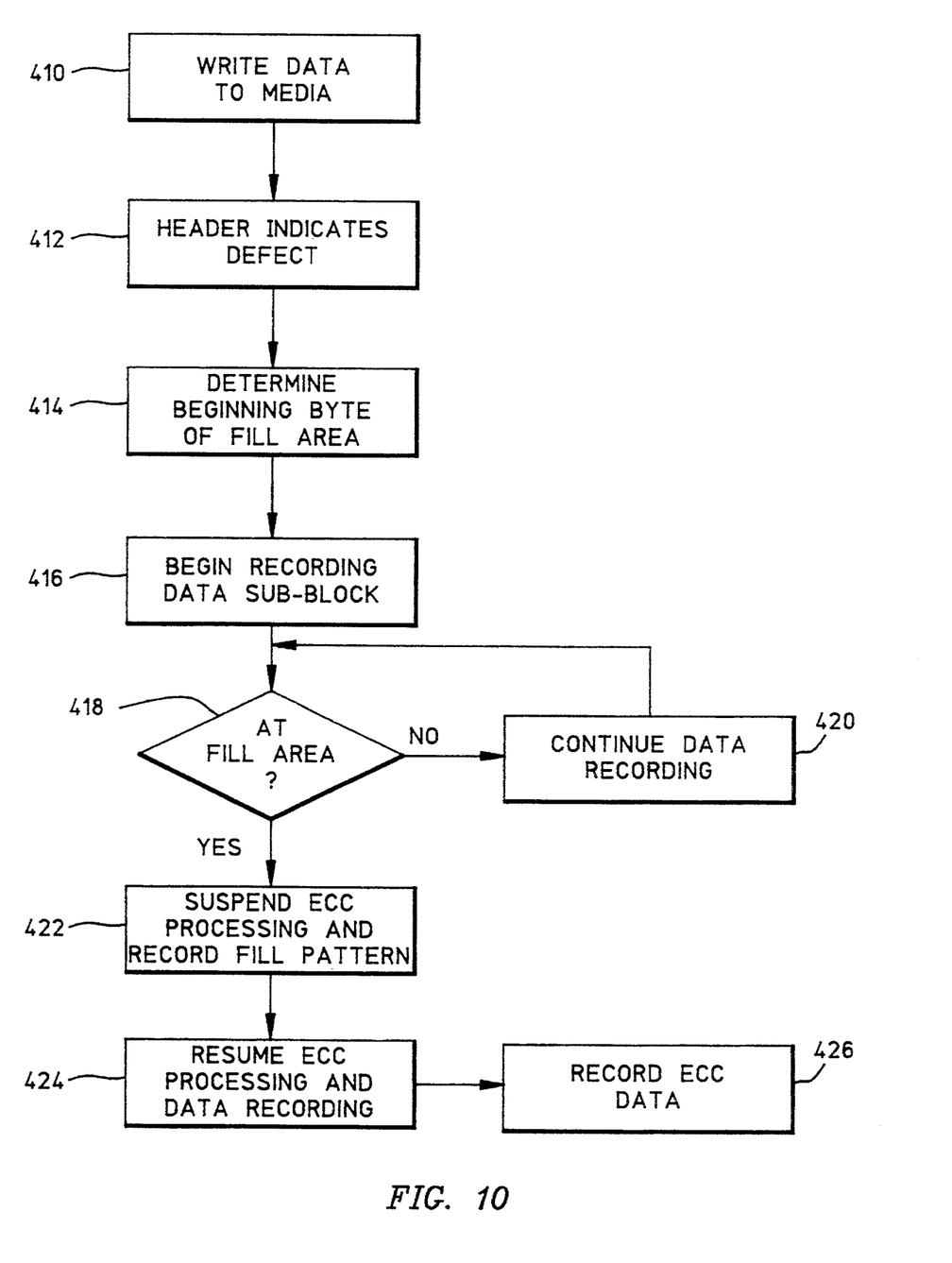

FIG. 10 illustrates the processing steps involved when the data storage device is recording data to a disk after a surface assessment and block formatting routine has been completed. For example, during the life of a storage media, the step numbered 410 of recording data to a disk will be carried out many times. The box numbered 412 indicates that the header field of the data block in question indicates a defect in a sub-block which will be skipped by a fill pattern block. At the box numbered 414, the data storage device determines the beginning byte of the area at which the fill pattern will be recorded by reading the byte offset value from the header field. The byte offset value is stored in the offset register 50 (FIG. 2). The indication of a defect at the box numbered 412 can be provided, for example, by detecting a non-zero value in the header field in which a defect offset location is recorded. In this way, the offset field indicates the presence of a defect in the block and also provides the location, such that steps 412 and 414 are performed simultaneously. At the step numbered 416, the device begins recording data in the data sub-block. In accordance with data recording methods, the data transfer unit 42 (FIG. 2) performs ECC processing as the data is recorded.

The decision box numbered 418 illustrates that, as data is recorded in the data subblocks, the storage device continually checks the byte counter 48 (FIG. 2) to determine if the read/write head is at the beginning byte of the area for recording the fill pattern. If the head is not at the beginning byte of the area, then the device continues recording data at the box numbered 420 and continues to compare the byte counter value with the byte offset value. If the byte counter value indicates the head is at the beginning byte of the area for recording the fill pattern, then the device suspends ECC processing and records the fill pattern at the box numbered 422. More particularly, if the distance m available for recording a data subblock between a defect to a reference point within a data block (such as the beginning byte) is less than the length n necessary for writing the data sub-block, then recording of the data field is suspended, along with ECC processing for the portion of the storage media extent inclusive of the defect area. After the fill pattern is recorded at step 422, the device resumes recording data and ECC processing at the box numbered 424. After the recording of data sub-blocks and ECC processing is completed for a data block, the storage device records the ECC data block and any remaining spare fill pattern blocks at the flow diagram box numbered 426. Thus, a data block can contain a series of data sub-blocks with defect areas, and fill pattern blocks, interspersed with data. The read/write head can maintain clock synchronization throughout the data block.

Figure 11:
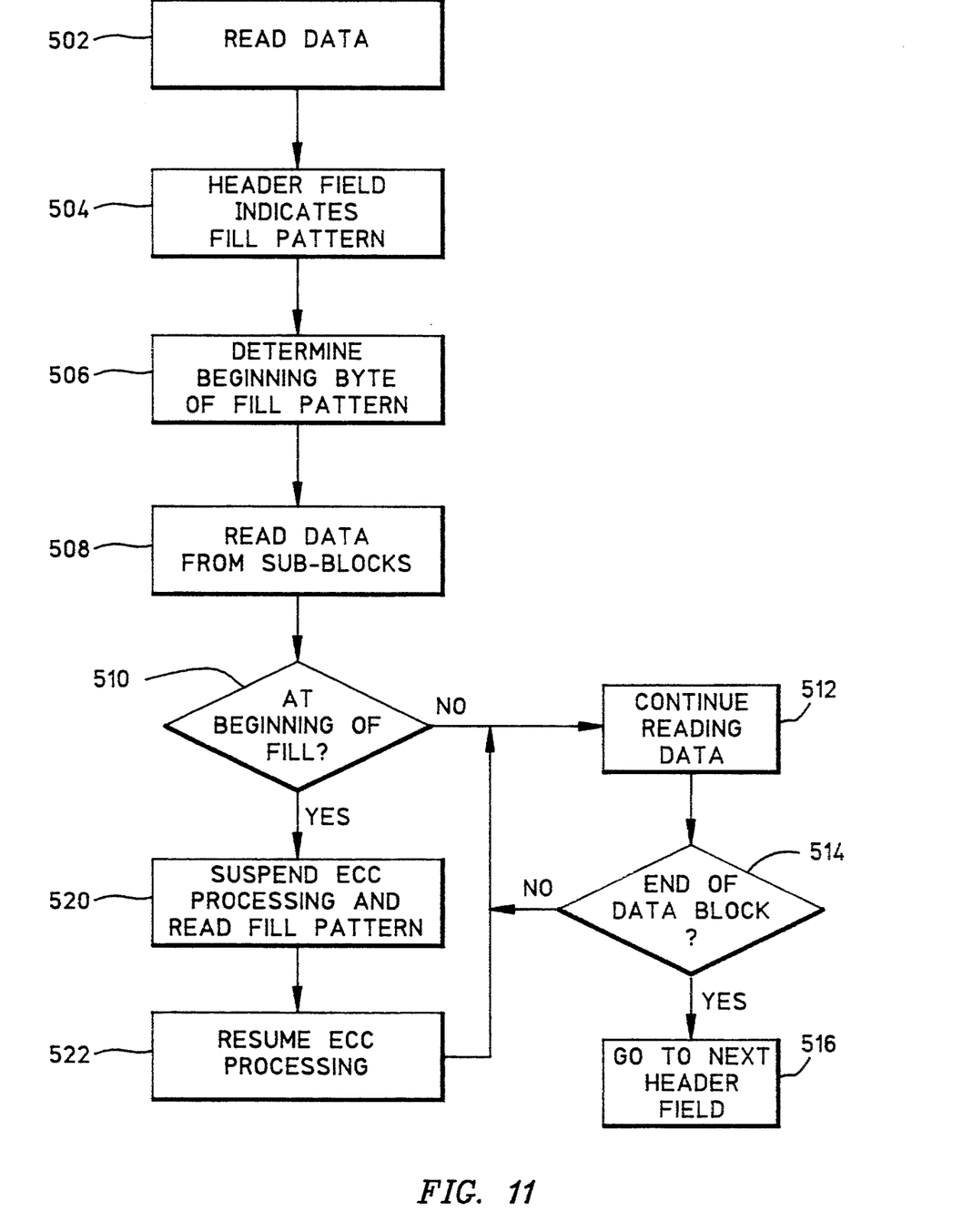

FIG. 11 illustrates the data storage device processing during a read operation. First, data reading from the disk begins at the flow diagram box numbered 502. At the box numbered 504, the header field indicates a data sub-block contains a fill pattern block. At the box numbered 506, the beginning byte of the fill pattern is determined by reading the appropriate data from the header field. As noted above, the step 504 indication of a defect and the step 506 determination of the defect location can be performed in the same step. At the box numbered 508, the data storage device begins reading data from the data sub-blocks. The decision box numbered 510 illustrates that the device continually checks to determine if the read/write head is at the beginning byte of a fill pattern block as the data is read from the sub-blocks by comparing the byte counter and the offset register. If the head is not at a fill pattern block, then the device continues reading data from the sub-block at the box numbered 512. The flow diagram box numbered 514 indicates that the device continually checks to determine if it is at the end of a data block. If the end of a data block has been reached, then the device proceeds to the header field of the next data block for reading, as indicated by the box numbered 516. If the end of a data block has not been reached, then reading of the current data block continues at step 512.

When the read/write head is positioned at the beginning of a fill pattern block, an affirmative result at the decision box numbered 510, then the data storage device suspends ECC processing and reads the fill pattern that was previously written over the defect area at the box numbered 520. After the fill pattern is read, ECC processing is resumed at the box numbered 522 and the device continues reading data from the data sub-blocks at the box numbered 512. Clock synchronization is maintained as the ECC processing is stopped and resumed. In this way, it is not necessary to break clock synchronization as the defect is passed and therefore recording clock acquisition blocks is not necessary, resulting in faster management of defects.

Thus, in accordance with the present invention, storage media defect areas that are too large to be managed by ECC processing alone and sufficiently small that sector skipping would be inefficient, are instead managed by a fill pattern recording scheme in which a pointer indicates the beginning of a defect area and a fill pattern is then recorded over the defect area while ECC processing is halted. In this way, the number of times sector skipping must be used for a storage media is reduced, thereby making more efficient use of the storage media surface area. In view of the description above, those skilled in the art will appreciate that the structure and method steps of the illustrated embodiment can be applied equally to storage formats other than fixed-block architectures without departing from the teachings of the invention.

The present invention has been described above in terms of a presently preferred embodiment so that an understanding of the present invention can be conveyed. There are, however, many configurations for storage devices and media not specifically described herein but with which the present invention is applicable. The present invention should therefore not be seen as limited to the particular embodiment described herein, but rather, it should be understood that the present invention has wide applicability with respect to storage devices and media generally. All modifications, variations, or equivalent arrangements that are within the scope of the attached claims should therefore be considered to be within the scope of the invention.

We claim:

1. A storage device for reading and recording data onto data fields of tracks in a storage medium susceptible to a defect and adapted for movement relative to a read/write head, the tracks having at least one data field and one error correction code field for correction of read errors, the read/write head recording onto the storage medium blocks of the data and of error correction code data determined in accordance with the data blocks, the read/write head recording in accordance with a clock synchronization signal, the device comprising:

defect location means for generating a defect signal indicating the location and extent of a defect area in a track of the storage medium; and a storage device controller that responds to the defect signal by determining if the defect area is of a size that is sufficiently small to maintain clock synchronization over the defect area but is sufficiently large to prevent correction of read errors using error correction code processing and controls the read/write head during recording of a data block in a data field that contains the defect to halt the recording of data and determining of error correction code data over the defect area, record a fill pattern over the defect area, and resume recording of data and determining of error correction code data thereafter.

2. A device as defined in claim 1, wherein the storage device controller determines the location of the defect area relative to a reference point in the data field and, if the extent of the data field from the reference point to the defect area is smaller than a data block to be recorded, controls the read/write head to record a first portion of the data block before the defect area and record a remaining portion of the data block after the defect area.

3. A system as defined in claim 1, wherein the storage device controller controls the read/write head to record the fill pattern over an area of the storage medium that is larger than the defect area and encompasses the defect area.

4. A device as defined in claim 1, wherein the data field includes a header field and the defect location means comprises a byte offset field within the header field that is detected by the storage device controller as it controls the read/write head to record data blocks in the data field.

5. A device as defined in claim 4, wherein the defect location means further comprises a surface assessment unit that can identify the location and extent of defects in the storage medium prior to data recording.

6. A device as defined in claim 5, wherein the storage controller operates in a disk initialization mode and a disk recording mode, wherein the storage controller responds to the defect signal in the disk initialization mode to record byte offset data in a byte offset field located within the header field, the byte offset data comprising the number of bytes relative to a reference point in the data field to the defect area, and to record at least one fill pattern block at the end of the data field regardless of the absence of any defect area in the data field.

7. A device as defined in claim 6, wherein the storage controller reads the byte offset data in the disk recording mode to determine the location of the defect area.

8. A device as defined in claim 6, wherein the offset data stored by the storage controller comprises the number of bytes necessary to center a fill pattern block about a defect area.

9. A device as defined in claim 6, wherein the offset data stored by the storage controller is set relative to a reference point comprising the beginning of the data field.

10. In a system for writing records onto the tracks of a storage medium, each record having at least a data field and an error correction code field determined over the data field, each track being susceptible to a defect, the system comprising:

recording means for recording a record Y onto a data track, the record Y including at least one spare field;

first means for determining the storage medium length m available for recording a data record between a defect on the track to a reference point within a record X already written on the track;

second means for determining the storage medium length n of the track necessary for writing record Y thereon; and third means responsive to the lengths determined by the first and second means for causing the recording means to suspend recording the data field and to suspend determining the error correction code of the record Y included along a portion of the track extent inclusive of the defect if the signals indicate that $m<n$, and for writing the spare field over the track defect in the form of a fill pattern, and for subsequently recording the data or error correction code data of the record Y.

11. A system according to claim 10, wherein the track extent inclusive of the defect area recorded over with the fill pattern lies in a range between the track extent occupied by the number of data bytes correctable by the error correction code field and the track extent passed over where the suspension of writing alone is invoked to accommodate the defect.

12. A storage device for reading and recording blocks of data into data fields in tracks along a storage medium that is susceptible to defect areas, the tracks having at least one data field for the recording of data blocks and one error correction-code field for the recording of error correction code data determined in accordance with the data blocks, the storage device comprising:
- a read/write head that records data onto the storage medium in accordance with a clock synchronization signal;
- a surface assessment unit that generates a defect signal indicating the location and extent of a defect area in a track of the storage medium; and
- control means for responding to the defect signal by determining if the defect area is of a size that is sufficiently small to maintain synchronization with the clock synchronization signal over the defect area but is sufficiently large to prevent correction of read errors using error correction code data and for controlling the read/write head during recording of a data block in a data field containing the defect area to halt the recording of the data block and halt the determining of error correction code data over the defect area, record a fill pattern over the defect area, and resume recording of the data block and determining of error correction code data thereafter.

13. A storage device as defined in claim 12, wherein the control means comprises:
- a data transfer unit that generates the error correction code in accordance with the bytes of a data block recorded in a data field of the storage medium; and
- a controller that determines the starting location of the fill pattern to be recorded over the defect area.

14. A storage device as defined in claim 13, wherein the controller determines the fill pattern starting location such that the fill pattern is recorded approximately centered about the defect area.

15. A method of recording data blocks onto data fields of tracks in a storage medium having at least one defect, the recording being performed by a read/write head in accordance with a clock synchronization signal, each data field having at least a header field, data field, and an error correction code field for correction of read errors, the method comprising the steps of:
- recording data blocks into the data fields of the storage medium and recording error correction code data determined over a data block as the data is recorded, each data block containing at least one spare pattern field;
- detecting pointer data in a header field, the pointer data indicating the location of a defect area in the block that is of a size sufficiently small to maintain clock synchronization over the defect area but sufficiently large to prevent correction of read errors using error correction code processing; and
- recording a portion of a data block before the indicated defect area, halting the recording of the data record and the determining of the error correction code data at the defect area, recording the spare pattern field over the defect area, and resuming the recording of the remaining portion of the data record and calculating of the error correction code data thereafter.

16. A method as defined in claim 15, wherein the step of detecting pointer data includes the steps of:
- performing a surface assessment to determine the location of defect areas in the storage medium that are of a size sufficiently small to maintain clock synchronization over the defect area but sufficiently large to prevent correction of read errors using error correction code processing;
- determining pointer data that indicates the location of the defect area relative to a predetermined reference location of the track; and
- recording pointer data in the header field of a track for later detection by the read/write head.

17. A method as defined in claim 15, wherein the step of recording comprises determining if the extent of the data field from the predetermined reference location to the defect area is smaller that the data block to be recorded and, if such is the case, recording a portion of the data block before the defect area and recording a remaining portion of the data block after the defect area.

18. A method for recording data blocks on a storage medium having at least one defect area disposed along a continuous data track, each block having at least a data field and an error correction code field determined over the data block as the data block is being recorded onto the track, comprising the steps of:
- recording data blocks along the data track, each block having at least one spare field;
- recording control information at the beginning of a data block in a special gap, the control information defining the distance from a reference point on the data track to a defect area existing along the track on which the block is to be recorded; and
- monitoring the control information during recording for recording at least one portion of the data block in a divided pattern, by suspending the writing of the data block and the calculation of the error correction code field, writing the spare field over the portion of the track inclusive of the defect using fill characters so that no part of the data block is registered over the defect on the track.

* * * * *